United States Patent
Arnal et al.

(10) Patent No.: US 11,814,325 B2
(45) Date of Patent: Nov. 14, 2023

(54) METHOD FOR COATING A CERAMIC MATRIX COMPOSITE PART WITH AN ENVIRONMENTAL BARRIER

(71) Applicant: SAFRAN CERAMICS, Le Haillan (FR)

(72) Inventors: Simon Arnal, Moissy-Cramayel (FR); Lisa Pin, Moissy-Cramayel (FR)

(73) Assignee: SAFRAN CERAMICS, Le Haillan (FR)

( * ) Notice: Subject to any disclaimer, the term of this patent is extended or adjusted under 35 U.S.C. 154(b) by 0 days.

(21) Appl. No.: 17/908,137

(22) PCT Filed: Feb. 25, 2021

(86) PCT No.: PCT/FR2021/050330
§ 371 (c)(1),
(2) Date: Aug. 30, 2022

(87) PCT Pub. No.: WO2021/176164
PCT Pub. Date: Sep. 10, 2021

(65) Prior Publication Data
US 2023/0121823 A1    Apr. 20, 2023

(30) Foreign Application Priority Data
Mar. 3, 2020    (FR) ...................... 2002156

(51) Int. Cl.
*C04B 41/00* (2006.01)
*C04B 41/50* (2006.01)
(Continued)

(52) U.S. Cl.
CPC ........ *C04B 41/5024* (2013.01); *C04B 41/009* (2013.01); *C04B 41/0072* (2013.01);
(Continued)

(58) Field of Classification Search
CPC ... C23C 24/10; C04B 41/0072; C04B 41/009; C04B 41/522
See application file for complete search history.

(56) References Cited

U.S. PATENT DOCUMENTS

| 2010/0129636 A1* | 5/2010 | Cybulsky | C23C 30/00 427/447 |
| 2011/0027470 A1* | 2/2011 | Kirby | C04B 41/89 427/142 |

(Continued)

FOREIGN PATENT DOCUMENTS

| CN | 106927866 A | 7/2017 |
| EP | 2 284 139 A2 | 2/2011 |

(Continued)

OTHER PUBLICATIONS

International Preliminary Report on Patentability and the Written Opinion of the International Searching Authority as issued in International Patent Application No. PCT/FR2021/050330, dated Sep. 6, 2022.

(Continued)

*Primary Examiner* — Nathan H Empie
(74) *Attorney, Agent, or Firm* — Pillsbury Winthrop Shaw Pittman LLP

(57) ABSTRACT

A method for coating a ceramic matrix composite part with an environmental barrier, the method including a) applying, to a surface of the part, a coating composition including a first powder of a rare earth silicate and a second powder including boron, the coating composition having a ratio R=[mass of the second powder]/[mass of the first powder] of between 0.1% and 5%, and b) sintering the first and second powders to obtain the environmental barrier on the part.

8 Claims, 3 Drawing Sheets

(51) Int. Cl.
  *C04B 41/45*  (2006.01)
  *C04B 41/52*  (2006.01)
  *C04B 41/87*  (2006.01)
  *C04B 41/89*  (2006.01)
  *C23C 24/10*  (2006.01)

(52) U.S. Cl.
  CPC ........ *C04B 41/4545* (2013.01); *C04B 41/522* (2013.01); *C04B 41/87* (2013.01); *C04B 41/89* (2013.01); *C23C 24/10* (2013.01)

(56) References Cited

U.S. PATENT DOCUMENTS

2016/0108510 A1* 4/2016 Kirby .................. C23C 4/02
  501/133
2017/0101348 A1 4/2017 Wan et al.

FOREIGN PATENT DOCUMENTS

| EP | 2 287 136 A2 | 2/2011 |
| EP | 3 141 631 A1 | 3/2017 |
| FR | 3 053 329 A1 | 1/2018 |
| WO | WO 2006/136755 A2 | 12/2006 |
| WO | WO 2014/143568 A1 | 9/2014 |

OTHER PUBLICATIONS

International Search Report as issued in International Patent Application No. PCT/FR2021/050330, dated May 6, 2021.

* cited by examiner

[Fig. 1]
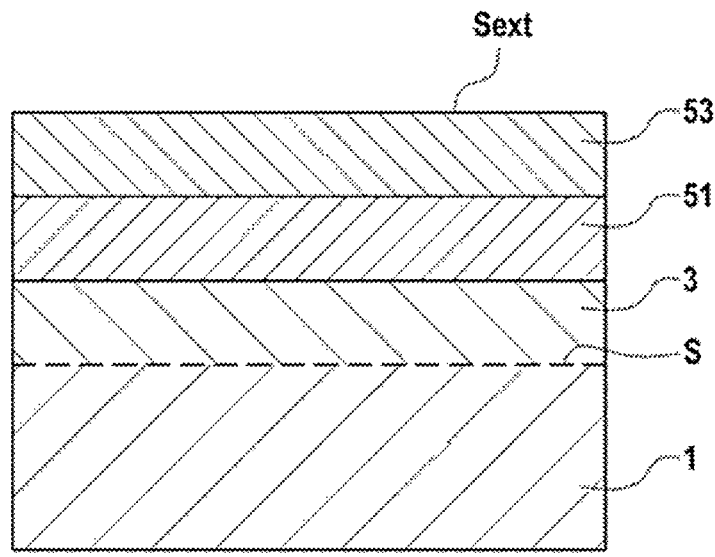
[Fig. 2]
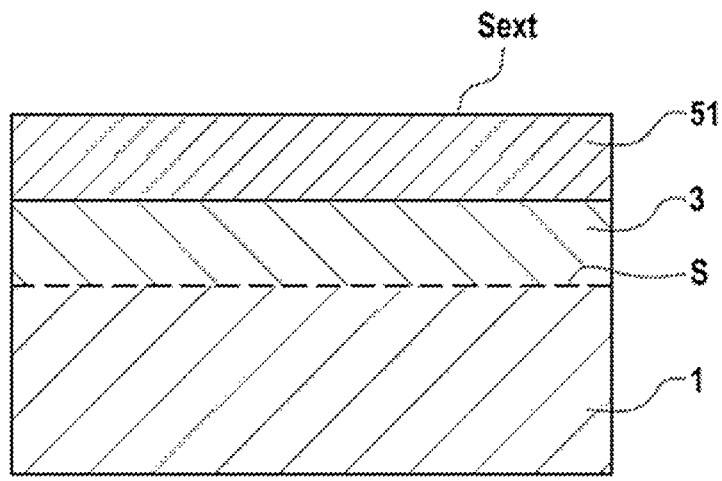

[Fig. 3]
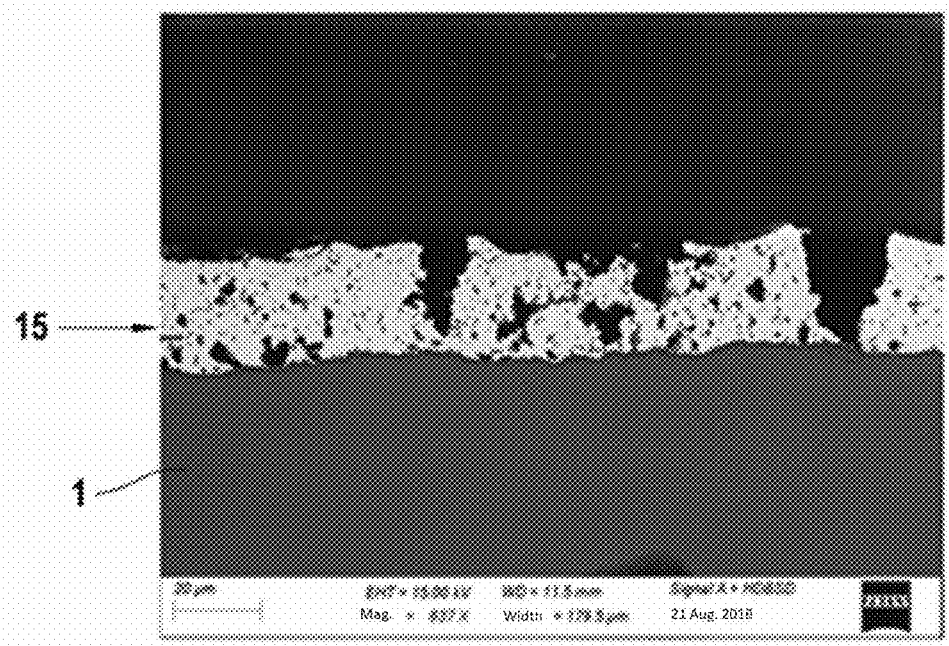
[Fig. 4]
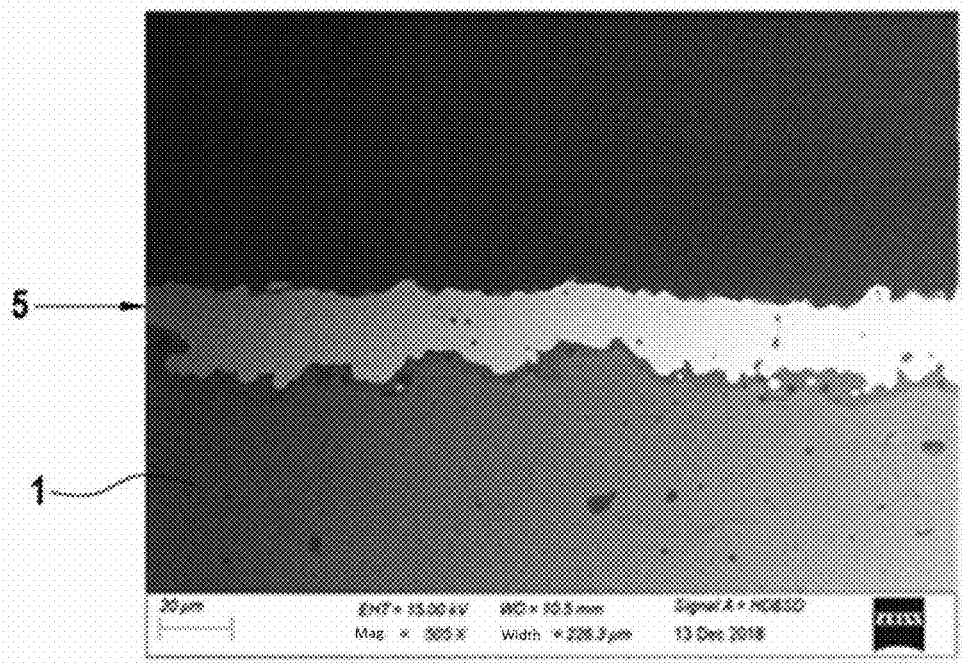

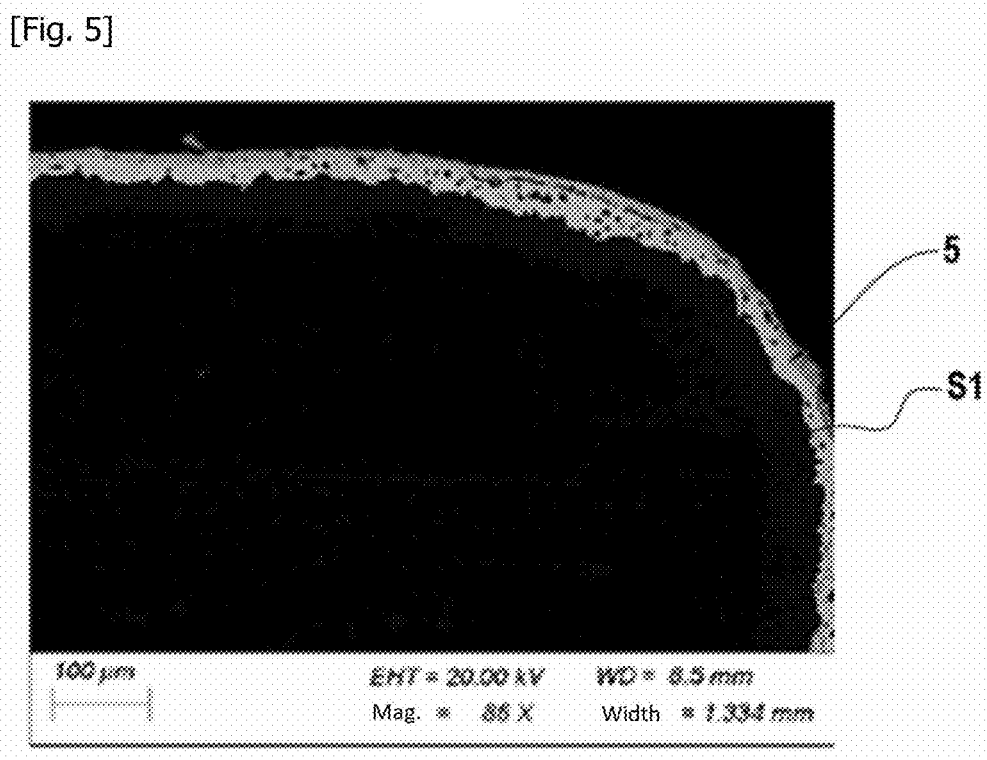
[Fig. 5]

METHOD FOR COATING A CERAMIC MATRIX COMPOSITE PART WITH AN ENVIRONMENTAL BARRIER

CROSS-REFERENCE TO RELATED APPLICATIONS

This application is the U.S. National Stage of PCT/FR2021/050330, filed Feb. 25, 2021, which in turn claims priority to French patent application number 2002156 filed Mar. 3, 2020. The content of these applications are incorporated herein by reference in their entireties.

TECHNICAL FIELD

The invention relates to a method for coating a ceramic matrix composite (CMC) part with an environmental barrier.

PRIOR ART

CMC's have good mechanical properties that make them suitable for constituting structural components and advantageously retain these properties at high temperatures.

However, these CMC's may degrade when used at high temperatures and in a corrosive environment, as is the case when they are present in aeronautical turbines. When the CMC part comprises a silicon carbide (SiC) matrix, the corrosion of the CMC results in the oxidation of the SiC to silica, which, in the presence of water vapour, volatilizes in the form of hydroxides $Si(OH)_4$. Corrosion phenomena lead to premature degradation of the CMC. Environmental Barrier Coatings (EBC) have therefore been developed in order to protect CMC's from corrosion at high temperatures.

Examples of usable environmental barriers include multilayer assemblies comprising a silicon bonding layer and a layer of a rare earth silicate (of the $RE_2Si_2O_7$ or $RE_2SiO_5$ type, for example $Y_2Si_2O_7$).

Different techniques may be implemented in order to form the environmental barriers. In particular, dry processing methods such as thermal spray or plasma spray deposition may be cited. One drawback of these techniques is that they have a relatively high implementation cost. Liquid processing methods such as the dip-coating technique have a lower implementation cost. In the context of liquid processing techniques, an environmental barrier may be formed by applying rare earth silicate particles in suspension in a liquid medium to the surface of the part, followed by drying and sintering of these particles. However, the environmental barriers obtained in this way may have cracks that reduce their gas tightness during operation.

DISCLOSURE OF THE INVENTION

The invention proposes, according to a first aspect, a method for coating a ceramic matrix composite part with an environmental barrier, the method comprising the following steps:
a) applying, to the surface of the part, a coating composition comprising a first powder of a rare earth silicate and a second powder comprising boron, the coating composition having a ratio R=[mass of the second powder]/[mass of the first powder] of between 0.1% and 5%, and
b) sintering the first and second powders in order to obtain the environmental barrier on the part.

The cracking of the environmental barrier observed in some environmental barriers from the prior art originates from the stresses generated during sintering. In order to prevent the environmental barrier from cracking and improve its density, the invention proposes introducing boron into the coating composition intended to be sintered. Boron is a fluxing agent for silicates and increases the creep of the coating at high temperatures and makes the system viscous in order to accommodate the stresses and prevent cracking. Boron is added in a specific relative mass content in relation to the rare earth silicate, i.e., such that the ratio R is greater than or equal to 0.1% in order to achieve the desired increase in creep at high temperatures, while maintaining a ratio R less than or equal to 5% in order not to negatively affect the properties of the environmental barrier obtained.

In one embodiment, the second powder comprises a boron powder. As a variant or in combination, the second powder comprises a powder of a boron compound, for example a ceramic boron compound. The second powder may thus comprise a boron carbide powder, a boron oxide powder, or a mixture of these powders.

In one embodiment, the rare earth silicate may be a rare earth disilicate or a rare earth monosilicate. In particular, the rare earth silicate may be $(Yb_aY_{1-a})_2Si_2O_7$ in which a is between 0 and 1, a being, for example, between 0.4 and 0.6, or $(Yb_bY_{1-b})_2SiO_5$ in which b is between 0 and 1, b being, for example, between 0.4 and 0.6.

In one embodiment, a temperature greater than or equal to 1350° C. is applied during sintering.

Carrying out the sintering operation at a high temperature makes it possible to further accommodate stresses and further reduce the risk of cracking of the environmental barrier. Indeed, rare earth silicates are materials that creep at high temperatures. Heat treatment at 1350° C. reduces the Young's modulus of the rare earth silicate, which allows it to further accommodate and dissipate the stresses experienced during sintering.

In one embodiment, the average size of the particles of the first powder and the average size of the particles of the second powder are each between 0.1 μm and 5 μm. The average size of the particles of the first powder may be substantially equal to the average size of the particles of the second powder.

Unless otherwise indicated, an "average" size denotes the size given by the statistical particle size distribution to half of the population, referred to as D50.

In one embodiment, the coating composition is applied to a bonding layer comprising silicon and present on the surface of the part.

In one embodiment, steps a) and b) are repeated in order to obtain the environmental barrier.

In one embodiment, the surface of the part to which the coating composition is applied during step a) locally forms an angle greater than or equal to 15°, for example greater than or equal to 20°.

The invention is particularly advantageous in this case because it makes it possible to obtain a dense and crack-free environmental barrier even for a part that has one or more irregular zones where the stresses generated during sintering are particularly high.

In one embodiment, the part is a turbomachine part.

The part may be a part of the hot section of a gas turbine of an aircraft engine or an industrial turbine. In particular, the part may constitute at least a section of a nozzle, a combustion chamber wall, a turbine ring sector or a turbomachine blade.

BRIEF DESCRIPTION OF THE DRAWINGS

FIG. 1 shows, schematically, a part coated with an environmental barrier in the context of a first example of a method according to the invention.

FIG. 2 shows, schematically, a part coated with an environmental barrier in the context of a second example of a method according to the invention.

FIG. 3 is a photograph obtained by scanning electron microscopy of a part coated with an environmental barrier in the context of a method outside the invention.

FIG. 4 is a photograph obtained by scanning electron microscopy of a part coated with an environmental barrier in the context of a method according to the invention.

FIG. 5 is a photograph obtained by scanning electron microscopy of a part coated with an environmental barrier in the context of a method according to the invention in an irregular zone of the part.

DESCRIPTION OF THE EMBODIMENTS

The composite material part intended to be coated with the environmental barrier comprises a fibrous reinforcement and a ceramic matrix present in the porosity of the fibrous reinforcement.

The fibrous reinforcement may comprise ceramic fibres or carbon fibres. The ceramic fibres may be silicon carbide fibres or oxide fibres, such as alumina fibres. As such, the silicon carbide fibres marketed under the trade name "Nicalon" or "Hi-Nicalon" by the Japanese company NGS or "Tyranno SA3" by the company UBE may be cited. The fibrous reinforcement may comprise silicon carbide fibres having an oxygen content less than or equal to 1% by atomic percentage, such as the fibres marketed under the trade name "Hi-Nicalon-S" by the Japanese company NGS. When the fibrous reinforcement comprises alumina fibres, the latter may be Nextel 610™ fibres. The fibres marketed under the trade name Torayca T300 by the company Toray are an example of carbon fibres that may be used.

The fibrous reinforcement may be produced as a single part by three-dimensional or multi-layer weaving. "Three-dimensional weaving" or "3D weaving" should be understood to mean a weaving method in which at least some of the warp threads interlink weft threads over several weft layers. The roles of the warp and weft threads can be swapped in the present text, and this should also be considered to be covered by the claims. The fibrous reinforcement may, for example, have a multi-satin weave, i.e., be a fabric obtained by three-dimensional weaving with several layers of weft threads in which the basic weave of each layer is equivalent to a conventional satin weave but with some points of the weave that interlink the layers of weft threads. As a variant, the fibrous reinforcement may have an interlock weave. "Interlock weave or fabric" should be understood to mean a 3D weave in which each layer of warp threads interlinks several layers of weft threads, with all the threads of a given warp column having the same movement in the weave plane. Different multilayer weaving methods that can be used to form the fibrous reinforcement are described, in particular, in document WO 2006/136755.

As a variant, the fibrous reinforcement may be obtained from a plurality of fibrous plies of two-dimensional or unidirectional fabric by laying up these plies on a form. These plies may optionally be interlinked, for example by sewing or installing threads, in order to form the fibrous reinforcement.

The part may further comprise an interphase present between the fibres and the matrix. The interphase may be monolayer or multilayer. The interphase may comprise at least one layer of pyrolytic carbon (PyC), boron nitride (BN), silicon-doped boron nitride (BN(Si), with silicon in a mass proportion of between 5% and 40%, the remainder being boron nitride) or boron-doped carbon (BC, with boron in an atomic proportion of between 5% and 20%, the remainder being carbon). The thickness of the interphase may, for example, be between 10 nm and 1000 nm, and, for example, between 10 nm and 100 nm. The function of the interphase in this instance is to de-embrittle the composite material, which promotes the deflection of possible cracks reaching the interphase after having propagated in the matrix, preventing or delaying the breaking of fibres as a result of such cracks.

The matrix densifies the fibrous reinforcement by being present in the porosity of the latter. The matrix coats the fibres of the fibrous reinforcement. The fibres are present in the matrix. The matrix may occupy the majority (i.e., more than 50%) of the volume of the accessible porosity of the fibrous reinforcement. In particular, the matrix may occupy more than 75%, or indeed substantially all, of the volume of this accessible porosity.

The matrix comprises one or more phases of ceramic material. The matrix may comprise at least one phase of a carbide, nitride or oxide. The matrix may, for example, comprise silicon carbide, or indeed be made entirely of silicon carbide. The matrix may be produced in different manners that are known per se. A liquid densification (impregnation with a matrix precursor resin and transformation by cross-linking and pyrolysis, the process being repeatable) or gas densification (chemical vapour infiltration of the matrix) method may be used, for example. The matrix phase may also be created by melt infiltration of silicon.

The part may be a static or rotating turbomachine part. Examples of turbomachine parts that may be coated in the context of the invention are mentioned above.

FIG. 1 shows a first example of an environmental barrier covering a CMC part 1. In this example, the environmental barrier is a multi-layer barrier, in this instance comprising two layers 51 and 53 each comprising a rare earth silicate.

In order to produce each of the layers 51 and 53, the coating composition has been applied to the surface S of the CMC part 1 (step a)). In this instance, the coating composition has been applied to a bonding layer 3 comprising silicon and present on the surface S of the part 1. In this example, the coating composition is applied directly to the bonding layer 3 (in contact with the latter). This bonding layer 3 may be a layer of silicon or metal silicide. However, the coating composition may be applied directly to the surface of the CMC part (in contact with the latter in the absence of a bonding layer 3) without departing from the scope of the invention. The coating composition may be applied by different methods that are known per se. The coating composition may be applied by a liquid processing method, for example by dip-coating, spin-coating, spray-coating or electrodeposition, in particular by electrophoresis. The coating composition may otherwise be deposited by thermal spray, for example by suspension plasma spray.

As indicated above, the coating composition comprises a first powder of a rare earth silicate and a second powder comprising boron which is different from the first powder. The boron is formulated in a specific amount such that the ratio R defined above is between 0.1% and 5%. Irrespective of the embodiment in question, the ratio R may for example be between 0.1% and 2%, and, for example, be substantially equal to 1%.

The coating composition may be in the form of a suspension comprising the first and second powders in a liquid medium. As a variant, the coating composition may be in solid and powdered form.

When the coating composition is in the form of a suspension, the coating composition may comprise:
- the first powder in an amount by volume of between 1% and 30%,
- the second powder in an amount by volume of between 0.1% and 5%, and
- the liquid medium in an amount by volume of between 65% and 98.9%.

When the coating composition is in solid and powdered form, the coating composition may comprise:
- the first powder in an amount by volume of between 95% and 99.9%, and
- the second powder in an amount by volume of between 0.1% and 5%.

The coating composition may be constituted essentially by the first powder, the second powder and the liquid medium, if present.

As indicated above, the rare earth silicate may be $(Yb_aY_{1-a})_2Si_2O_7$ in which a is between 0 and 1, a being, for example, between 0.4 and 0.6, or $(Yb_bY_{1-b})_2SiO_5$ in which b is between 0 and 1, b being, for example, between 0.4 and 0.6. Irrespective of the embodiment in question, the second powder may be a boron powder (element B), a boron carbide powder ($B_4C$), a boron oxide powder ($B_2O_3$), or a mixture of these powders.

Once applied, the coating composition is subjected to a heat treatment which will allow the elimination of any liquid medium that was used, and the sintering of the powders present so as to obtain the environmental barrier layer (step b)).

A temperature greater than or equal to 1000° C., for example greater than or equal to 1350° C., may be applied during the sintering. The temperature applied during the sintering may be between 1000° C. and 1400° C., for example between 1350° C. and 1400° C.

In the example shown in FIG. 1, steps a) and b) have been repeated in order to obtain the environmental barrier that has the two layers 51 and 53. The first layer 51 may comprise a rare earth disilicate and the second layer 53 a rare earth monosilicate. Each of these layers comprises boron in order to reduce the cracking of the coating during sintering, as mentioned above. When repeating steps a) and b), it is possible to apply different rare earth silicates in different layers of the environmental barrier and/or different second powders. The environmental barrier, and in particular the second layer 53 in the example shown, defines the outer surface $S_{ext}$ of the coated part. This surface $S_{ext}$ is, for example, intended to be in contact with the hot gas flow circulating in the flow path when the part is a turbomachine part. A multi-layer environmental barrier having two layers is shown, but the environmental barrier may comprise more than two layers each comprising a rare earth silicate without departing from the scope of the invention.

FIG. 2 shows another example of a part coated with an environmental barrier in which the environmental barrier is, in this instance, a monolayer environmental barrier, comprising only the layer 51. The same features described above for FIG. 1 apply to FIG. 2.

Irrespective of the embodiment in question, the thickness of the environmental barrier obtained may be greater than or equal to 1 µm, for example greater than or equal to 10 µm. The thickness of the environmental barrier may, in particular, be between 1 µm and 200 µm, for example between 10 µm and 200 µm.

FIG. 3 shows an environmental barrier 15 formed by a method outside the invention without boron being added to the coating composition (sintering temperature of 1300° C.). Cracking can be seen in the environmental barrier formed.

FIG. 4 shows the result obtained by implementing the invention, in which it can be seen that the environmental barrier 5 formed on the part 1 is not cracked, due to the addition of boron to the coating composition (ratio R equal to 1% and sintering temperature of 1350° C. in the test carried out). Similarly, FIG. 5 shows the good material condition of the environmental barrier obtained even if the coated surface S1 has an irregular feature (ratio R equal to 1% in the test carried out and sintering temperature of 1350° C.).

The expression "between . . . and . . . " should be understood to include the limit values.

The invention claimed is:

1. A method for coating a ceramic matrix composite part with an environmental barrier, the method comprising:
   a) applying, to a surface of the part, a coating composition comprising a first powder of a rare earth silicate and a second powder comprising boron, the coating composition having a ratio R=[mass of the second powder]/[mass of the first powder] of between 0.1% and 5%, wherein the second powder comprises a boron carbide powder, and
   b) sintering the first and second powders to obtain the environmental barrier on the part, the second powder being a fluxing agent and making the coating composition viscous to accommodate stresses and prevent cracking of the environmental barrier during sintering.

2. The method according to claim 1, wherein the rare earth silicate is $(Yb_aY_{1-a})_2Si_2O_7$ in which a is between 0 and 1, or $(Yb_bY_{1-b})_2SiO_5$ in which b is between 0 and 1.

3. The method according to claim 1, wherein a temperature greater than or equal to 1350° C. is applied during the sintering.

4. The method according to claim 1, wherein an average size of the particles of the first powder and the average size of the particles of the second powder are each between 0.1 µm and 5 µm.

5. The method according to claim 1, wherein the coating composition is applied to a bonding layer comprising silicon and present on the surface of the part.

6. The method according to claim 1, wherein steps a) and b) are repeated to obtain the environmental barrier.

7. The method according to claim 1, wherein the surface of the part to which the coating composition is applied during step a) locally forms an angle greater than or equal to 15°.

8. The method according to claim 1, wherein the part is a turbomachine part.

* * * * *